United States Patent
Graham et al.

(10) Patent No.: US 7,771,311 B2
(45) Date of Patent: Aug. 10, 2010

(54) ENHANCED CATALYST PERFORMANCE BY ENGINE LOAD ADJUSTMENT

(75) Inventors: Christopher R. Graham, Lake Orion, MI (US); David N. Belton, Birmingham, MI (US)

(73) Assignee: GM Global Technology Operations, Inc.

( * ) Notice: Subject to any disclaimer, the term of this patent is extended or adjusted under 35 U.S.C. 154(b) by 318 days.

(21) Appl. No.: 12/056,486

(22) Filed: Mar. 27, 2008

(65) Prior Publication Data

US 2009/0217916 A1    Sep. 3, 2009

Related U.S. Application Data

(60) Provisional application No. 61/032,234, filed on Feb. 28, 2008.

(51) Int. Cl.
*F16H 59/00* (2006.01)
(52) U.S. Cl. ..................................... 477/98
(58) Field of Classification Search ............... None
See application file for complete search history.

(56) References Cited

U.S. PATENT DOCUMENTS

| 6,146,309 | A  | * | 11/2000 | Nishino et al. | 477/98 |
| 6,537,178 | B1 | * | 3/2003 | Takizawa et al. | 477/76 |
| 2009/0199560 | A1 | * | 8/2009 | Maier et al. | 60/700 |

* cited by examiner

*Primary Examiner*—Dirk Wright

(57) ABSTRACT

A method comprises operating an engine of a vehicle to provide output torque to an input of a torque converter, determining whether the engine is in a cold start condition, fixing an input shaft of a transmission when the engine is in the cold start condition, and coupling the input shaft of the transmission to an output of the torque converter. A control module comprises a combustion control module that operates an engine of a vehicle to provide output torque to an input of a torque converter, a NPD module that determines whether the engine is in a cold start condition, and a transmission control module that fixes an input shaft of a transmission when the engine is in the cold start condition, wherein the input shaft of the transmission is in communication with an output of the torque converter.

18 Claims, 3 Drawing Sheets

ENHANCED CATALYST PERFORMANCE BY ENGINE LOAD ADJUSTMENT

CROSS-REFERENCE TO RELATED APPLICATIONS

This application claims the benefit of U.S. Provisional Application No. 61/032,234, filed on Feb. 28, 2008. The disclosure of the above application is incorporated herein by reference.

FIELD

The present invention relates to catalytic converter performance in a vehicle, and more specifically to reducing catalytic converter light-off time.

BACKGROUND

The statements in this section merely provide background information related to the present disclosure and may not constitute prior art.

Catalytic converters may reduce emissions in vehicles with an internal combustion engine. The catalytic converter may be a three-way catalytic converter and may include a substrate with a coating of catalyst materials. The catalytic converter may stimulate oxidation of hydrocarbons and carbon monoxide and reduction of nitrogen oxides. The catalysts may operate optimally when a temperature of the catalytic converter is above a minimum temperature that is in a range between 200° C. to 300° C. Emissions control using a catalytic converter may be difficult during a cold start because the catalytic converter has not reached the optimal temperature.

Catalytic converter warm-up (or "light-off") time may be reduced during a cold start by generating high engine-out energy. The engine-out energy may be dependent on the exhaust temperature and mass flow rate of the exhaust. Retarding ignition timing and increasing engine idle speed may reduce cold start emissions by increasing exhaust temperature and mass flow rate. However, the impact of these strategies may be limited since retarding ignition timing lowers engine efficiency and may be perceived by the driver as approaching an engine stall.

SUMMARY

A method comprises operating an engine of a vehicle to provide output torque to an input of a torque converter, determining whether the engine is in a cold start condition, fixing an input shaft of a transmission when the engine is in the cold start condition, and coupling the input shaft of the transmission to an output of the torque converter.

A control module comprises a combustion control module that operates an engine of a vehicle to provide output torque to an input of a torque converter, a NPD module that determines whether the engine is in a cold start condition, and a transmission control module that fixes an input shaft of a transmission when the engine is in the cold start condition, wherein the input shaft of the transmission is in communication with an output of the torque converter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present teachings will become more fully understood from the detailed description and the accompanying drawings, wherein.

DETAILED DESCRIPTION

Figure 1:
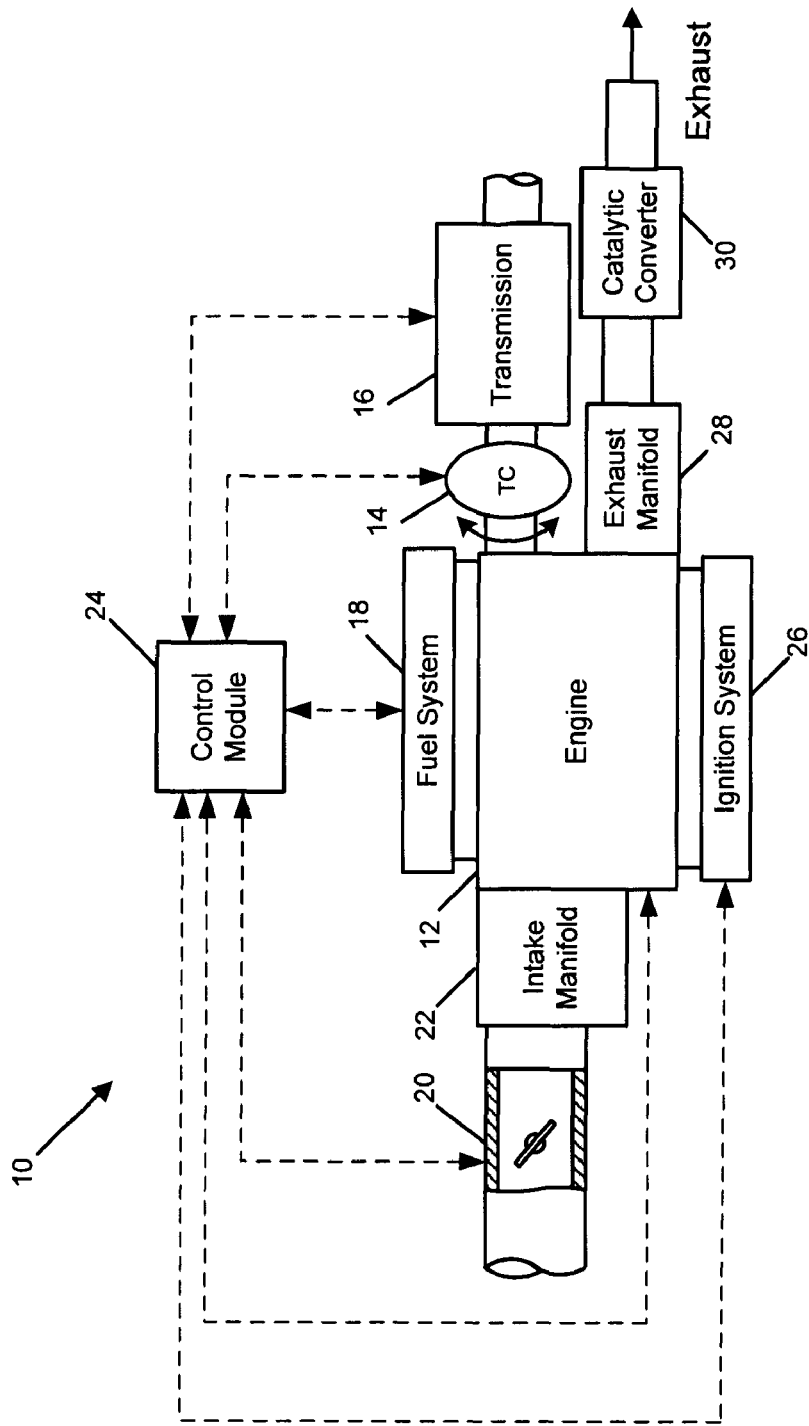
FIG. 1 is a schematic illustration of an exemplary vehicle.

The following description is merely exemplary in nature and is in no way intended to limit the present teachings, applications, or uses. For purposes of clarity, the same reference numbers may be used in the drawings to identify similar elements. As used herein, the term module refers to an application specific integrated circuit (ASIC), an electronic circuit, a processor (shared, dedicated or group) and memory that execute one or more software or firmware programs, a combinational logic circuit, or other suitable components that provide the described functionality.

An exemplary vehicle 10 may include engine 12, torque converter 14, transmission 16, fuel system 18, throttle 20, intake manifold 22, control module 24, ignition system 26, exhaust manifold 28, and catalytic converter 30. Engine 12 may be in communication with fuel system 18, intake manifold 22, and ignition system 26 to receive air, fuel, and a spark, respectively, to combust the air and fuel within cylinders (not shown) of engine 12. The air input may be controlled by throttle 20 and received by intake manifold 22 to be provided to engine 12. Fuel may be provided to engine 12 by fuel system 18 which may include a fuel pump (not shown), a fuel rail (not shown), and fuel injectors (not shown) to provide the fuel to the cylinders of engine 12. The spark may be provided by ignition system 26.

Control module 24 may be in communication with engine 12, fuel system 18, throttle 20, and ignition system 26 to control the amount and timing of fuel, air, and spark delivered to the cylinders of engine 12. The combustion may provide power to drive pistons (not shown) within the cylinders which in turn rotate a crankshaft (not shown) of engine 12 to provide an output torque. The output torque of engine 12 may be provided to an input of torque converter 14. Torque converter 14 may transmit output torque from engine 12 to transmission 16.

Transmission 16 may be an automatic transmission. An input shaft of transmission 16 may receive a torque converter 14 output. In normal operation, brakes or bands (not shown) and clutches (not shown) within transmission 16 may be hydraulically controlled to selectively engage or fix gears of a planetary gear (not shown) within transmission 16 to change a gear ratio or drive mode.

In order to allow engine load adjustment when the vehicle is in park or neutral, the input shaft of transmission 16 may be fixed by the selective operation of brakes or bands and clutches within transmission 16. In such a condition torque converter 14 may slip and the engine 12 may load against torque converter 14. When vehicle 10 is operated in this manner, the operation may be referred to as neutral pseudo drive (NPD). When vehicle 10 is in NPD mode, exhaust gas from engine 12 may have an increased temperature and mass flow rate due to the increased loading of the engine output.

Exhaust gas from engine 12 may exit engine 12 through exhaust manifold 28 to catalytic converter 30. Catalytic converter 30 may be a three-way catalytic converter including a substrate with a coating of catalyst materials. The catalytic converter may stimulate the oxidation of hydrocarbons and carbon monoxide and the reduction of nitrogen oxides. Catalytic converter 30 may begin to operate optimally when the temperature of catalytic converter 30 is at a minimum temperature that is in a range between 200° C. to 300° C. The time it takes to reach this temperature may be referred to as catalyst light-off time, and may vary based on the catalysts, construction, or other materials used in the particular catalytic converter 30. By increasing engine 12 loading in NPD mode as was described above, catalyst light-off time may be decreased.

Figure 2:
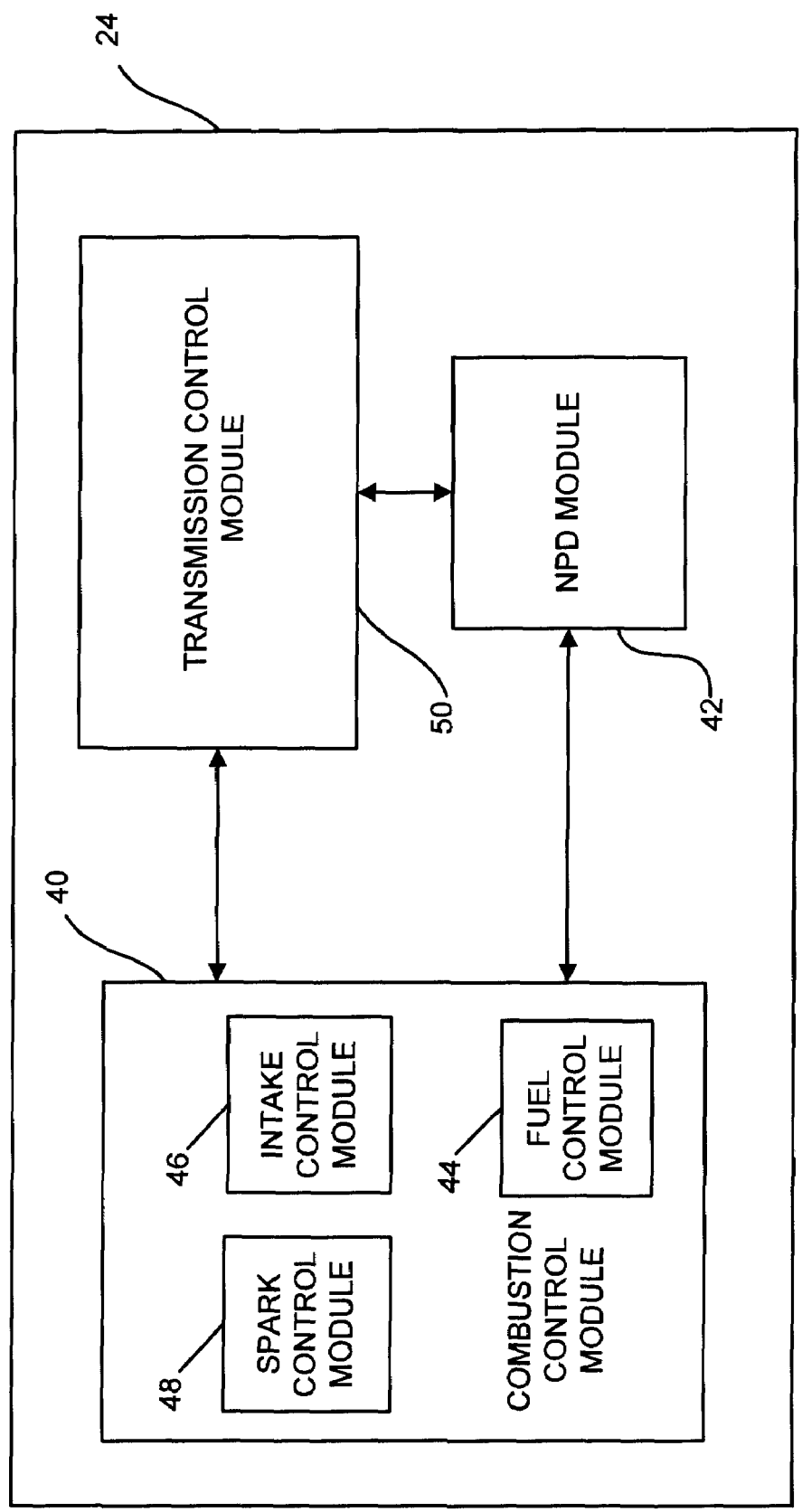
FIG. 2 is a block diagram of a control module for a vehicle.

Referring now to FIG. 2, control module 24 is depicted. Control module 24 may include combustion control module 40, neutral pseudo drive (NPD) module 42, and transmission control module 50. Combustion control module 40 may include fuel control module 44, intake control module 46, and spark control module 48.

NPD module 42 may be in communication with combustion control module 40, transmission control module 50, and sensors (not shown) throughout vehicle 10. NPD module 42 may receive input parameters such as whether the vehicle ignition is ON or OFF, temperature measurements throughout the vehicle including measurements correlating to a catalytic converter 30 temperature, and may include stored values such as predetermined thresholds related to catalytic converter 30 light-off time and temperature. NPD module 42 may communicate to combustion control module 40 and transmission control module 50 whether to operate in NPD mode based on vehicle conditions.

Combustion control module 40, fuel control module 44, intake control module 46, and spark control module 48 may control the supply and timing of fuel, air, and spark to operate engine 12 in a desired manner. This may include creating output power in response to driver commands under normal operation. Engine 12 may also be operated to provide late spark timing such that the fuel and air are ignited late in the combustion cycle to provide a reduced power to drive the pistons of engine 12 and a high temperature exhaust to exhaust manifold 28. Engine 12 may also be operated to provide output torque that is loaded against torque converter 14 in NPD mode, thereby producing a high-temperature exhaust with a high mass flow rate to exhaust manifold 28 and catalytic converter 30.

Transmission control module 50 may be in communication with torque converter 14 and transmission 16. Transmission control module 50 may operate torque converter 14 and transmission 16 in a normal manner in response to user commands. Torque converter 14 may transfer output torque from engine 12 to transmission 16 and desired gear ratios and drive modes may be selected with transmission 16. In response to a signal from NPD module 42 to enter NPD mode, transmission control module 50 may operate transmission 16 to fix brakes or bands and/or engage clutches of transmission 16 to fix an input shaft of transmission 16 such that the output torque of engine 12 is tied up within torque converter 14.

Figure 3:
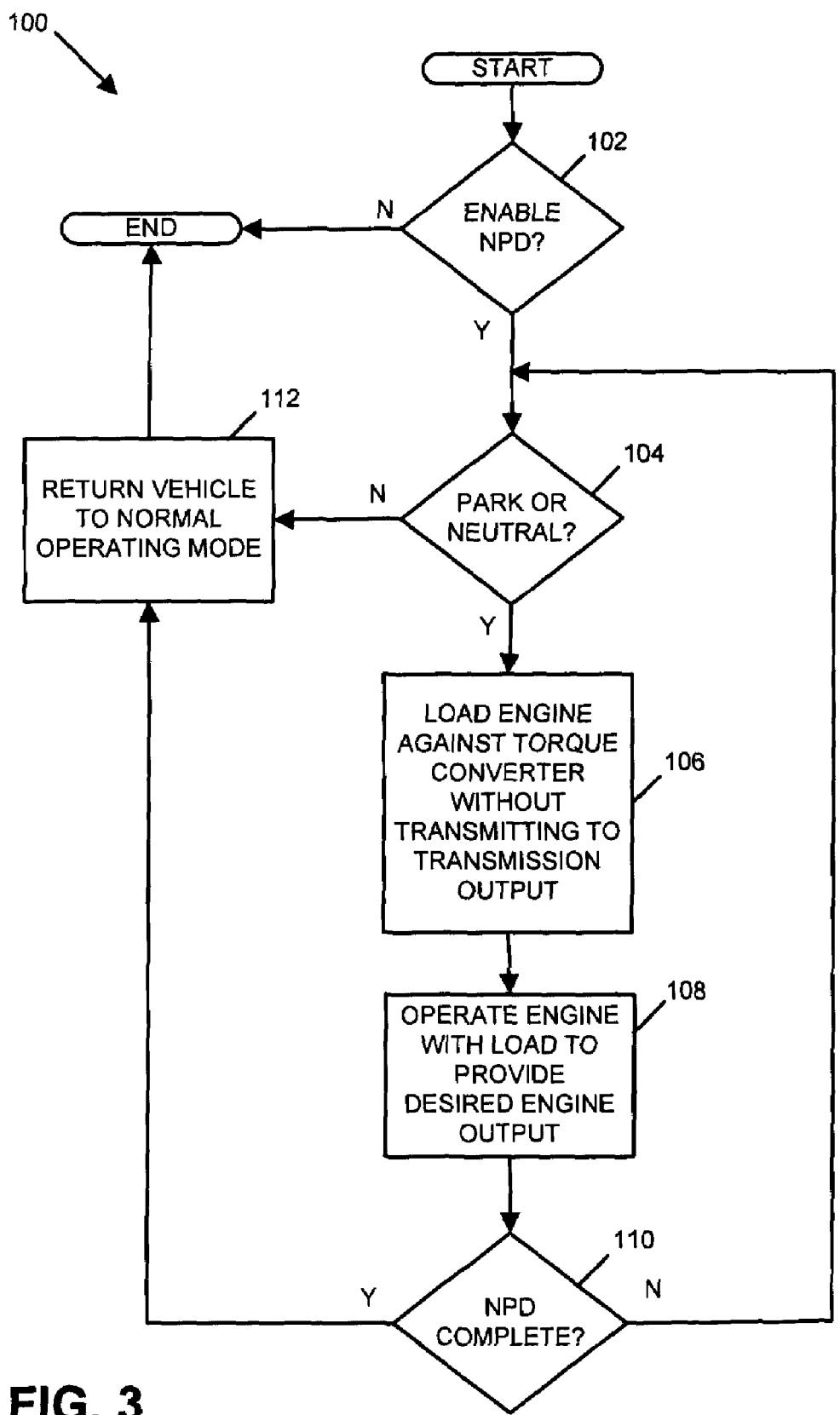
FIG. 3 is a flow diagram describing steps that provide for enhanced catalyst performance by engine load adjustment.

Referring now to FIG. 3, control logic 100 for enhanced catalyst performance by engine load adjustment is depicted. At block 102, NPD module 42 may determine whether NPD mode is required. NPD module 42 may consider whether the vehicle ignition has just turned from OFF to ON and may consider other parameters such as a catalytic converter temperature to determine whether heated exhaust should be supplied to catalytic converter 30. If NPD mode is not required, control logic 100 may end. If NPD mode is required, control logic 100 may continue to block 104.

At block 104, NPD module 42 may determine whether the vehicle 10 transmission 16 is in neutral or park. NPD module 42 may prevent NPD mode from fixing the input shaft of transmission 16 when the driver places the transmission 16 in drive or reverse. If transmission 16 is in neutral or park, control logic 100 may continue to block 106. If transmission 16 is not in neutral or park, control logic 100 may continue to block 112.

At block 106, NPD module 42 may communicate to combustion control module 40 and transmission control module 50 that NPD mode is required. Transmission control module 50 may fix an input shaft of transmission 16 such that torque converter 14 receives an output torque from engine 12. Any output torque from engine 12 may be tied up within torque converter 14 which may slip as an input shaft to torque converter 14 may rotate while an output shaft may not. In this manner, even though engine 12 may be loaded against torque converter 14, torque may not be transmitted through transmission 16. Because transmission 16 does not output torque, a driver may not perceive a difference in vehicle 10 operation during NPD mode from a conventional idle. Control logic 100 may then continue to block 108.

At block 108, combustion control module 40, fuel control module 44, intake control module 46, and spark control module 48 may provide combustion within cylinders of engine 12 to provide an increased output torque that is loaded against torque converter 14. The exhaust gas provided by the loaded engine 12 during catalyst 30 light-off may be in excess of 300° Celsius. As compared to a standard neutral or park operating mode where the engine is idled, this loaded condition may increase the heat of the exhaust, the mass flow rate of the exhaust, and the exhaust manifold 28 pressure. This may result in more heat delivered from engine 12 to catalytic converter 30, resulting in a reduced time until catalyst light-off.

Although the loading of engine 12 against torque converter 14 in park or neutral may reduce the need for late spark timing strategies to provide increased heat, late spark timing may also be used in conjunction with engine 12 loading to decrease catalyst light-off time. Reducing the need for late spark timing may provide for more stable combustion and reduce engine vibration during catalyst light-off. Loading engine 12 in NPD mode may also allow the engine 12 to be operated in a manner such that a shift from park or neutral to drive or reverse may be less noticeable to a driver. Control logic 100 may continue to block 110.

At block 110, NPD module 42 may determine whether NPD mode is complete. NPD module 42 may compare the time of NPD operation to a predetermined time associated with catalyst 30 light-off in a particular vehicle configuration. NPD module 42 may also consider catalyst 30 temperature. A desired catalyst 30 temperature may be 200° C.-300° C. If NPD mode is complete, control logic 100 may continue to block 112. If NPD mode is not complete control logic 100 may return to block 104.

At block 112, transmission control module 50 may release the input shaft to transmission 16 such that torque converter 14 may transfer torque from engine 12 to transmission 16. Control logic 100 may then end.

Those skilled in the art may now appreciate from the foregoing description that the broad teachings of the present disclosure may be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:
operating an engine of a vehicle to provide output torque to an input of a torque converter;
determining whether the engine is in a cold start condition;
fixing an input shaft of a transmission when the engine is in the cold start condition; and
coupling the input shaft of the transmission to an output of the torque converter.

2. The method of claim 1, further comprising increasing the output torque of the engine when the engine is in the cold start condition.

3. The method of claim 2, wherein the increasing the output torque includes increasing a mass air flow and temperature of an exhaust from the engine.

4. The method of claim 1, wherein the determining includes:
monitoring an ignition status; and
identifying the cold start condition when the ignition status transitions from OFF to ON.

5. The method of claim 1, wherein the determining includes:
monitoring a catalytic converter temperature; and
identifying the cold start condition when the catalytic converter temperature is less than a predetermined minimum catalytic converter temperature.

6. The method of claim 1, further comprising delaying spark timing of the engine to increase a heat of an exhaust and decrease a power to drive a piston.

7. The method of claim 1, further comprising monitoring a transmission gear selection and fixing the input shaft of the transmission when the engine is in the cold start condition and the transmission gear selection is one of park and neutral.

8. The method of claim 1, further comprising continuing the fixing for a predetermined time.

9. The method of claim 1, further comprising continuing the fixing until a catalytic converter reaches a predetermined catalytic converter light-off temperature.

10. A control module, comprising:
a combustion control module that operates an engine of a vehicle to provide output torque to an input of a torque converter;
a neutral pseudo drive (NPD) module that determines whether the engine is in a cold start condition; and
a transmission control module that fixes an input shaft of a transmission when the engine is in the cold start condition, wherein the input shaft of the transmission is in communication with an output of the torque converter.

11. The control module of claim 10, wherein the combustion control module increases the output torque from the engine when the engine is in the cold start condition.

12. The control module of claim 11, wherein an exhaust of the engine has increased mass air flow and temperature and reduced emissions content.

13. The control module of claim 10, wherein the NPD module identifies the cold start condition when an ignition transitions from OFF to ON.

14. The control module of claim 10, wherein the NPD module monitors a catalytic converter temperature and identifies the cold start condition when the catalytic converter temperature is less than a predetermined minimum catalytic converter temperature.

15. The control module of claim 10, wherein the combustion control module delays spark timing of the engine to increase a heat of an exhaust and decrease a power to drive a piston.

16. The control module of claim 10, wherein the NPD module monitors a transmission gear selection and the transmission control module fixes the input shaft of the transmission when the engine is in the cold start condition and the transmission gear selection is one of park and neutral.

17. The control module of claim 10, wherein the transmission control module fixes the input shaft of the transmission for a predetermined time.

18. The control module of claim 10, wherein the transmission control module fixes the input shaft of transmission until a catalytic converter reaches a predetermined catalytic converter light-off temperature.

* * * * *